United States Patent
Krzywonos et al.

(10) Patent No.: US 10,250,555 B2
(45) Date of Patent: Apr. 2, 2019

(54) METHODS AND SYSTEMS FOR IMPLEMENTING VERY LARGE DNS ZONES

(71) Applicant: BLUECAT NETWORKS, INC., Toronto (CA)

(72) Inventors: Timothy Krzywonos, Bowmanville (CA); Richard N. Hyatt, Markham (CA); Paul Brown, Berkshire (GB); Dmitri Dehterov, Richmond Hill (CA); Steven P. Meyer, Richmond Hill (CA)

(73) Assignee: BLUECAT NETWORKS, INC., Toronto (CA)

( * ) Notice: Subject to any disclaimer, the term of this patent is extended or adjusted under 35 U.S.C. 154(b) by 0 days.

(21) Appl. No.: 15/616,846

(22) Filed: Jun. 7, 2017

(65) Prior Publication Data

US 2017/0339096 A1    Nov. 23, 2017

Related U.S. Application Data

(63) Continuation of application No. 14/710,505, filed on May 12, 2015, now abandoned.

(60) Provisional application No. 62/008,155, filed on Jun. 5, 2014.

(51) Int. Cl.
H04L 29/08 (2006.01)
H04L 29/12 (2006.01)

(52) U.S. Cl.
CPC ........ *H04L 61/1511* (2013.01); *H04L 61/301* (2013.01); *H04L 61/305* (2013.01)

(58) Field of Classification Search
CPC .................... H04L 61/1511; H04L 61/305
See application file for complete search history.

(56) References Cited

U.S. PATENT DOCUMENTS

| | | | |
|---|---|---|---|
| 2009/0013210 A1* | 1/2009 | McIntosh | H04L 41/0672 714/4.1 |
| 2013/0103819 A1 | 4/2013 | Meyer et al. | |
| 2014/0280916 A1* | 9/2014 | Balasubramanian | H04L 61/1511 709/224 |

OTHER PUBLICATIONS

Eastlake, D., et al., "US Secure Hash Algorithms (SHA and SHA-based HMAC and HKDF)", RFC 6234, 2011, pp. 1-254.
Elz, R., et al., "Clarifications to the DNS Specification", RFC 2181, 1997, pp. 1-30.
Fowler, G., et al., "The FNV Non-Cryptographic Hash Algorithm <draft-eastlake-fnv-03.txt>", 2012, retrieved from https://tools.ietf.org/html/draft-eastlake-fnv-03, pp. 1-36.
"HP Virtual Application Networks SDN Controller, Technical white paper", 2013, retrieved from http://h17007.www1.hp.com/docs/networking/solutions/sdn/4AA4-8807ENW.PDF, pp. 1-6.

(Continued)

*Primary Examiner* — Adnan M Mirza
(74) *Attorney, Agent, or Firm* — One LLP; Joseph K. Liu

(57) ABSTRACT

Systems, methods and devices are provided for registering DNS hostnames of Internet host devices for very large domain zones (VLZ) stored on a DNS server on a network, including setting a pseudo-zone as the VLZ, intercepting DNS updates to the pseudo-zone, mapping the entries in the pseudo-zone into a hierarchy of real parent zones and sub-zones using a mapping formula, and translating DNS updates to the pseudo-zone from an original fully qualified domain name (FQDN) into a at least one new FQDNs and adding the at least one new FQDNs to an authoritative DNS Server.

8 Claims, 6 Drawing Sheets

(56) References Cited

OTHER PUBLICATIONS

MIT 6.02 Draft Lecture Notes, Lecture 7: Detecting Bit Errors, 2010, retrieved from web.mit.edu/6.02/www/f2010/handouts/lectures/L7.pdf, pp. 1-6.

Mockapetris, P., "Domain Names—Concepts and Facilities", RFC 1034, 1987, pp. 1-110.

Mockapetris, P., "Domain Names—Implementation and Specification", RFC 1035, 1987, pp. 1-51.

Prince, M., "Introducing CNAME Flattening: RFC-Compliant CNAMEs at a Domain's Root", 2014, retrieved from http://blog.cloudflare.com/introducing-cname-flattening-rfc-compliant-cnames-at-domains-root, pp. 1-11.

Rooney, T., "Introduction to IP Address Management", IEEE Press, John Wiley & Sons, Inc., 2010, pp. 1-263.

Rooney, T., "IP Address Management Principles and Practice", IEEE Press, John Wiley & Sons, Inc., 2011, pp. 1-419.

Rose, S., et al., "DNAME Redirection in the DNS", RFC 6672, 2012, pp. 1-44.

"Software-Defined Networking (SDN) Definition", 2014, retrieved from https://www.opennetworking.org/sdn-resources/sdn-definition, pp. 1-3.

Vixie, P., et al., "Dynamic Updates in the Domain Name System (DNS Update)", RFC 2136, 1997, pp. 1-24.

\* cited by examiner

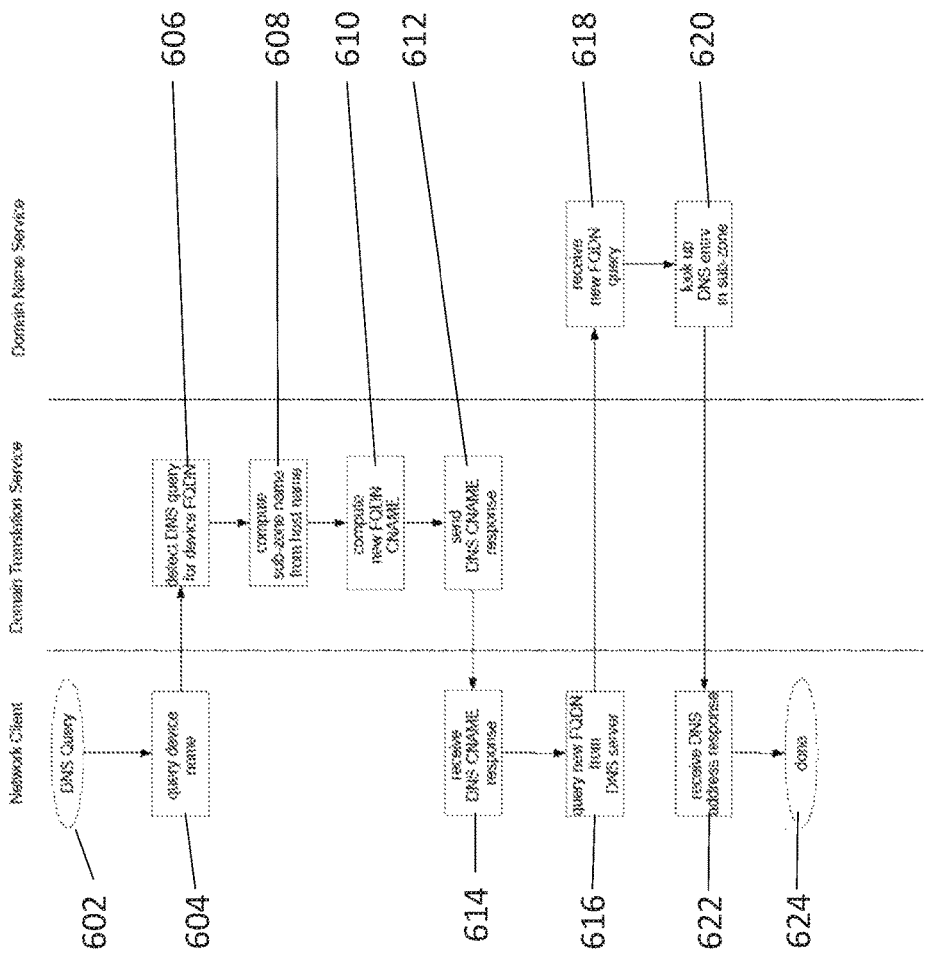

METHODS AND SYSTEMS FOR IMPLEMENTING VERY LARGE DNS ZONES

CROSS-REFERENCE TO RELATED APPLICATIONS

This application is a continuation of U.S. patent application Ser. No. 14/710,505, filed May 12, 2015, which claims priority to U.S. Provisional Application No. 62/008,155, entitled "METHOD AND SYSTEM FOR IMPLEMENTING VERY LARGE DNS ZONES" filed Jun. 5, 2014, both of which are hereby incorporated by reference in their entireties and for all purposes.

FIELD

This invention relates generally to the field of DNS zone management.

BACKGROUND

One of the effects of the proliferation of specialized devices on the Internet (the Internet of Things, or IoT) is that keeping track of very large numbers of similar devices, distributed over a large geographic area and different versions of devices, is a non-trivial problem because these devices may need to be tracked and maintained for decades, even as the Internet infrastructure around them evolves. For example, a network of utility meters may be required to control millions of such devices. In another example, a network of fire alarm sensors comprising many millions of devices may be monitored by a single network service. In yet another example, each streetlight in a city can be controlled and monitored by means of an Internet service. These devices may be organized by the Internet service according to the DNS domains in which they are a) configured to register themselves or b) registered by some other process.

Historically, host names have been used to register Internet devices and map their network addresses using the world-wide, distributed network of Domain Name System (DNS) [RFC1034] servers. Internet devices can make use of this ubiquitous functionality by registering their identities with a DNS server under a zone that is predetermined for the service offered by the device. A typical device name can consist of a character string derived from unique attributes of the device, such as the network MAC address and the device serial number. However, the large number of hosts that can be registered to a single zone places a heavy processing burden on the individual DNS servers and negatively affects performance of the system, for example, by causing the server to take unacceptably long to boot up and start running. Furthermore, if the zone server fails, it can affect a very large number of devices, with possibly disastrous consequences depending on the implementation.

In order to be able to use the DNS for IoT devices, methods and systems are desirable to limit the size of each DNS zone and to spread the load over a number of different servers without compromising the ability to update and query for IoT devices by domain names.

Thus, needs exist for improved techniques of large DNS zone management.

SUMMARY

Provided herein are embodiments of systems and methods that provide enhanced DNS zone management including storing large numbers of DNS host names in a very large zone (VLZ). The configuration of these systems and methods is described in detail by way of various embodiments which are only examples.

The systems and methods disclosed can include:

A) defining a pseudo-zone to represent the VLZ at issue, the pseudo-zone being a unique, one-way map from each original fully qualified domain name (FQDN) of a host name into a hierarchy of one or more subzones, wherein the number of subzones of the hierarchy is predetermined to distribute the hosts among the subzones and thereby limit the number of host names in each subzone to a predetermined manageable size.

B) Mapping the entries in the pseudo-zone into a hierarchy of real zones by means of a mapping formula.

C) Translating each DNS update to the VLZ from the original fully qualified domain name (FQDN) into a new FQDN incorporating the pseudo-zone uniquely derived from the original FQDN and adding the new FQDN to the DNS. As such, one original FQDN may result in one FQDN mapping.

D) Responding to DNS queries for one of the translated domain names in the VLZ by intercepting the query, converting the query to one or more modified DNS queries and sending the modified query to a DNS server that is able to resolve the new FQDN and convey the DNS response to the requestor.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 6 is a logic flow diagram for a DNS Query using a CNAME Response.

DETAILED DESCRIPTION

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

Provided herein are systems and methods including updating Domain Names to the DNS for very large zones (VLZ), the querying of values from a VLZ and the mapping function used to convert the FQDNs.

Mapping Function

Apart from the IETF rules governing domain name syntax [RFC1035], there is no approved standard or convention for the creation of host names for devices on the Internet of Things (IoT). However, since global uniqueness of host names is often required, such names often include text and numeric strings based on one or more local attributes of the device. These can include, for example, the network MAC address, the serial number, the manufacturer's name or identifier, the device version number, the type of device, date of manufacture, country of sale and provisioning identifier. To elaborate, these attributes can be combined to form a Globally Unique Identifier (GUID) string of the form: xxxxxxxx-xxxx-xxxx-xxxx-xxxxxxxxxxxx, where x represents an alphanumeric number in the range [0-9, a-f]

A device that is connected to a network in the domain (e.g. "somezone") may therefore try to register its host name with a DNS server using dynamic DNS (DDNS). The DDNS update may therefore attempt to register the FQDN with the authoritative server for "somezone" as: "12345678-1234-1234-1234-0123456789abcd.somezone"

Figure 1:
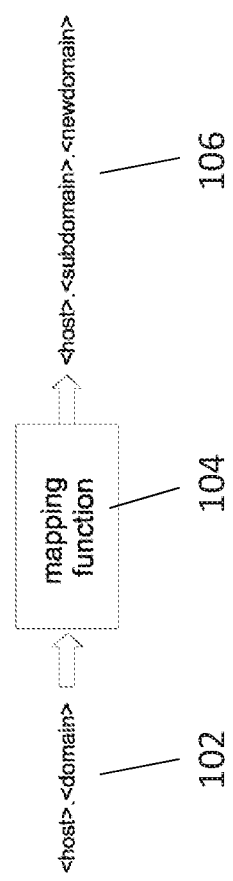
FIG. 1 is a high level representation of mapping functionality.

FIG. 1 is a high level representation of mapping functionality 100. As shown in FIG. 1, a host and domain 102 can be run through a mapping function 104 and output a host, subdomain and newdomain 106.

Figure 2:
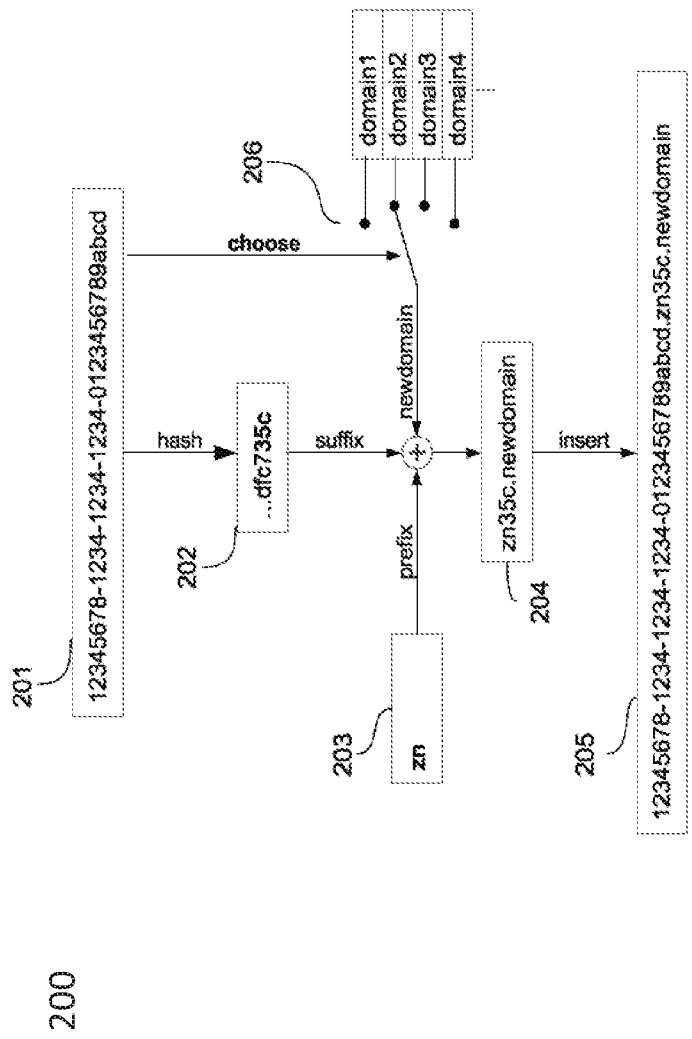
FIG. 2 is a mapping algorithm diagram for an example embodiment of a mapping algorithm.

FIG. 2 is a mapping algorithm diagram 200 for an example embodiment of a mapping algorithm.

In some embodiments, the server receiving the update request may apply a mapping function, as illustrated in FIG. 1 and FIG. 2, so that the domain name may be mapped into a zone hierarchy, based on the following, as shown in more detail in FIG. 2;

A) The original domain name 201 can be passed through a hash function and truncated to obtain an n-bit number hash string 202, where n is chosen such that the n-bit number is uniformly distributed in the range [0, m−1] where m is the number of sub-zones desired to hold the domain names. The hash function can be chosen from a wide selection of such functions, for example, the CRC [CRC], FNV hash algorithm [FNV] or SHA-2 digest [RFC6234], provided that it offers a satisfactory uniform distribution over the chosen range. A sub-zone 204 can be an alphabetic prefix 203 followed by the hash string 202. Prefixes themselves are DNS-compliant.

B) A new parent domain 206 can be selected from a predefined list of parent domains. The new parent domain 206 can be determined by taking a modulus of the hash and using it as a selector of the parent domain to use.

C) A new FQDN 205 is synthesized by inserting the new sub-zone into the old FQDN between the host name and the parent domain. For example: "12345678-1234-1234-1234-0123456789abcd.zn35c.newdomain".

This new FQDN can be used for the DDNS registration and the subzone (e.g. "zn35c") may be created if it does not already exist.

Registration

Registration of DNS entries may be accomplished by means of Dynamic DNS updates as well as other means, such as IP address management [IPAM] as is well known in the art.

Figure 3:
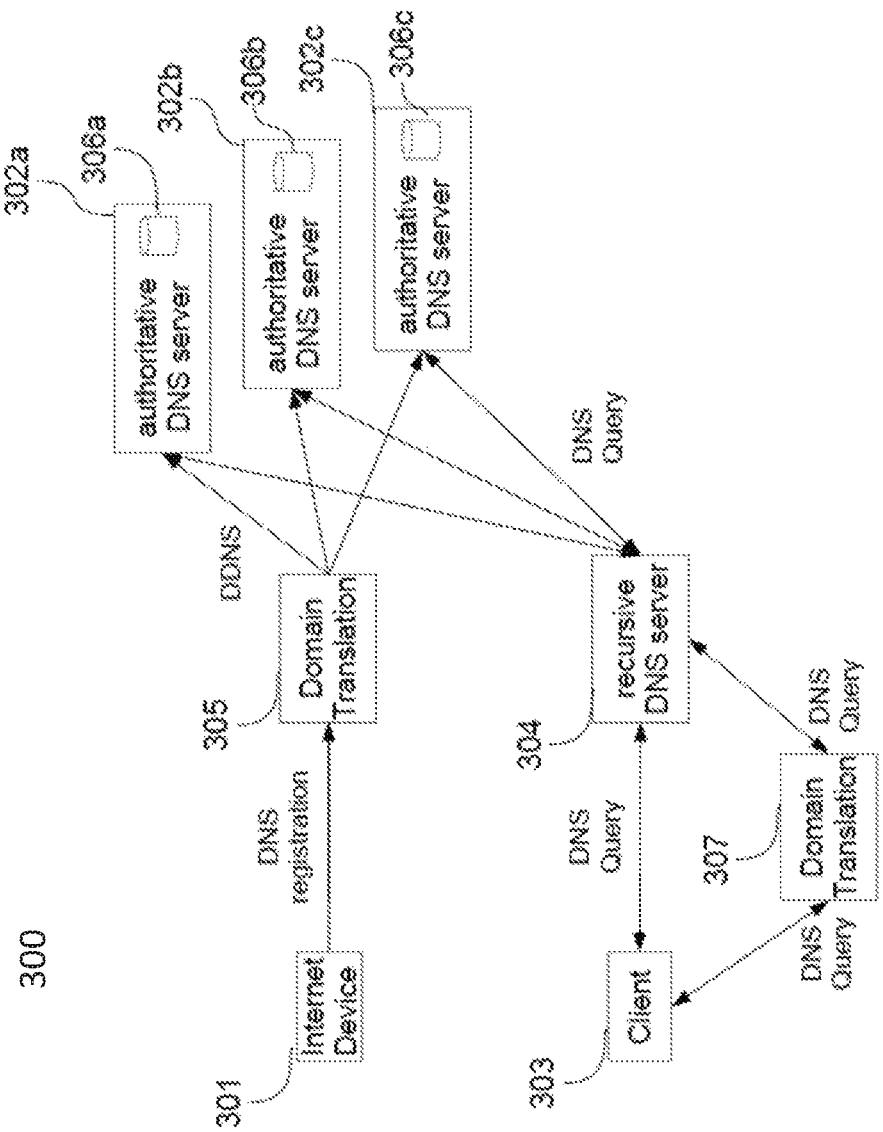
FIG. 3 is a mapping interaction diagram.

FIG. 3 is a message interaction diagram 300. As shown in FIG. 3, a Domain Translation Service, which can be a software component including instructions stored in memory that can be running in a network server (such as a DNS server) or a Software Defined Network (SDN) controller, that receives the DDNS update from an Internet device 301 over a network, can perform the mapping function to obtain a new FQDN and pass this new FQDN to the DDNS server (302a, 302b, 302c, etc.) appropriate to the parent zone in the FQDN. The DNS server (302a, 302b, 302c or others) can then create a sub-zone if it does not already exist and store the new FQDN as a resource record, for example an A record or an AAAA record, in a DNS data store. The FQDN may not be stored but rather it is recalculated every time a request is made (query or update). An example of a device which can function as a server can be seen in FIG. 14 of U.S. Patent Application Publication No. 2013/0103819 which is incorporated by reference herein in its entirety.

Figure 4:
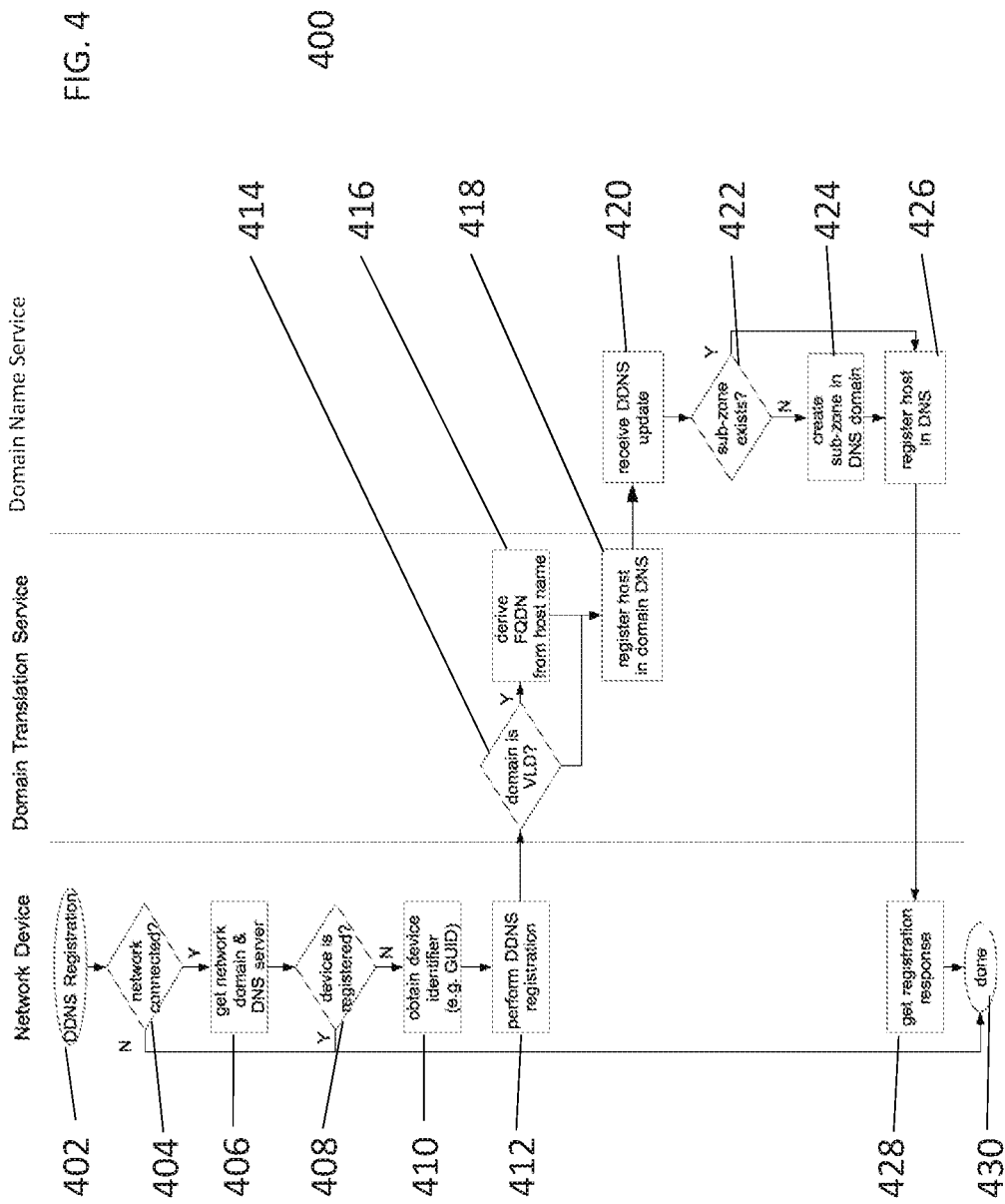
FIG. 4 is a logic flow diagram for a Dynamic DNS update using a Domain Translation Service.

In some embodiments of this invention, as illustrated in FIG. 4, the Domain Translation Service may include a software module for receiving the FQDN update request via one of a variety of protocols, such as DDNS, HTTPS, REST and so on, a mapping function for performing the translation from the original FQDN to the new FQDN and a sender for registering the DDNS update to the DNS server using the DDNS update protocol [RFC2136].

FIG. 4 is a logic flow diagram 400 for a Dynamic DNS update using a Domain Translation Service. In the example embodiment, a network device can perform a DDNS registration step 402 where the network device determines whether it is network connected in step 404. If it is not network connected, then the DDNS registration ends in step 430. If the network device is network connected in step 404 then it gets a network domain and DNS server in step 406. In step 408 the device determines if it is already registered. If it is already registered then the DDNS registration ends in step 430. If it is not already registered then it obtains a device identifier, such as a GUID in step 410. Next the device performs a DDNS registration in step 412.

In step 414 the network device undergoes a check to determine if the domain is a very large domain. If it is a very large domain then it derives a FQDN from a host name in step 416, after which it registers the host in domain DNS in step 418. If the domain is not a very large domain in step 414 then it skips step 416 and goes directly to step 418.

After step 418, a DDNS update is received in step 420. Next a determination is made of whether a sub-zone exists in step 422. If a sub-zone does not exist then a sub-zone is created in the DNS domain in step 424 before registering the host in DNS in step 426. If a sub-zone does exist in step 422 then step 424 is skipped before moving to step 426. Next a registration response is sent to the network device in step 428 before the process ends in step 430

In another embodiment, the Domain Translation Service may be implemented as a function of a network switch in, for example, a Software Defined Network [ref SDN] installation, wherein the Domain Translation Service may perform modification of the FQDN in the DDNS update message while the message is in transit.

DNS Queries

Figure 5:
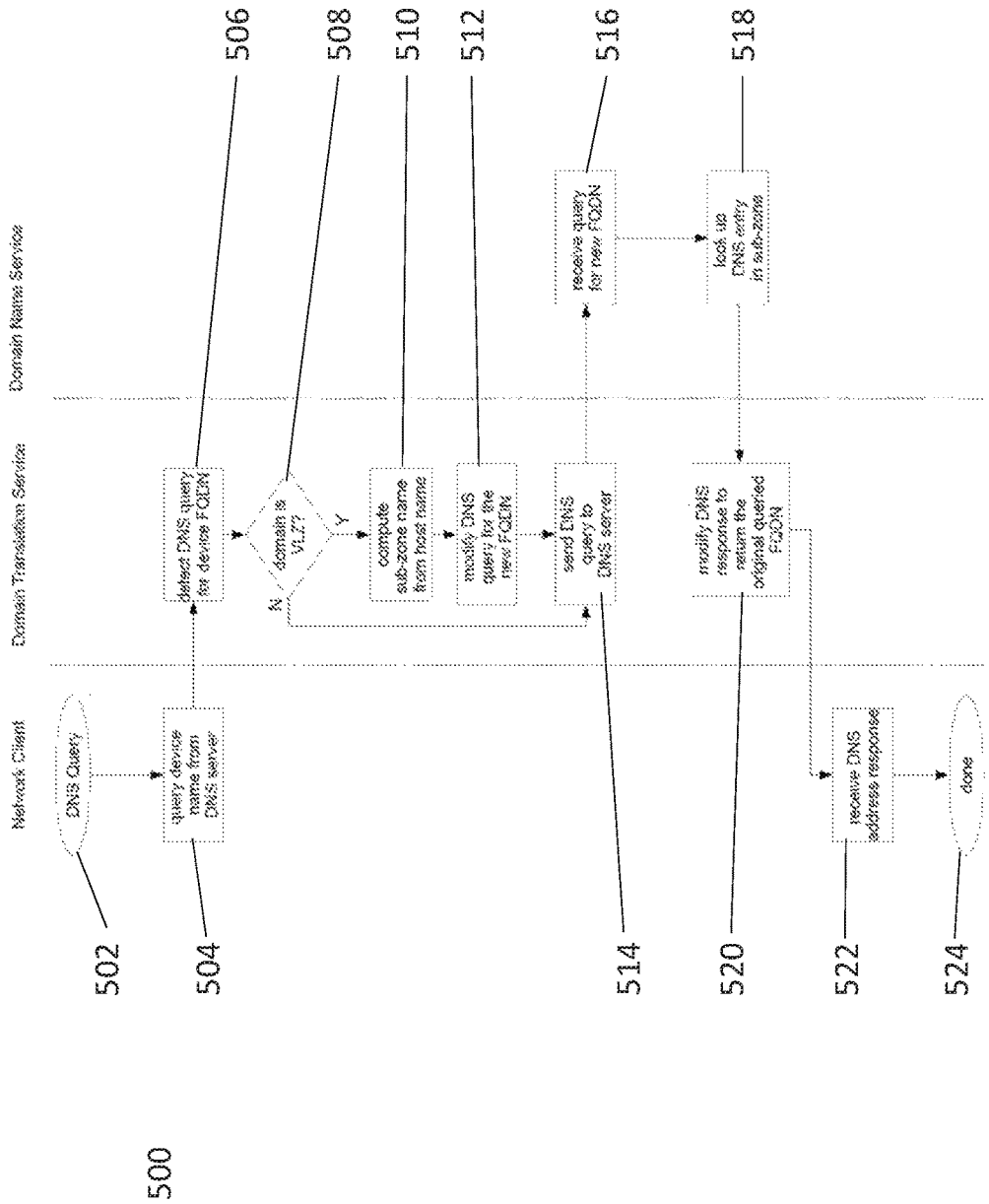
FIG. 5 if a logic flow diagram for a DNS Query using a Domain Translation Service.

As illustrated in FIG. 3, a client 303 can query the device FQDN from a recursive DNS server 304 which in turn can query an authoritative server 302a, 302b, 302c for the VLD from the plurality of authoritative servers 302a, 302b, 302c, or others. In some embodiments, as shown in FIG. 5, the authoritative DNS server for the domain can: receive the DNS query from client 303; perform a check to determine if the domain is a VLD; if the domain is not a VLD, the query can be handled normally by the DNS server; if the domain is a VLD, the FQDN may be synthesized by means of the mapping function; the synthesized FQDN may be resolved by the DNS server if this is possible and the queried resource records types can be returned to the requestor, recursive server 304, as a CNAME record; or if the CNAME domain references a different authoritative server, the authoritative DNS Server can perform recursion to resolve it from the plurality of authoritative servers 302a, 302b, 302c, etc. this time for the new FQDN in the synthesized CNAME resource record and receive the authoritative answer resource records from the DNS data store 306a, 306b, 306c, etc. and return them to the requestor, recursive server 304; or return the synthesized CNAME to the requestor, recursive server 304 as a DNS response in order for the requestor to perform the DNS recursion. A time-to-live (ttl) value of the CNAME response can be small to limit the size of cache needed to store the CNAMEs in use on the network; return the DNS response answer to client 303.

In yet another embodiment, querying a device FQDN by a network client can be accomplished whereby a DNS query message to a DNS server 304 is passed through a Domain Translation 307, for example, a Software Defined Network [SDN] installation, wherein the Domain Translation 307 can perform modification of the FQDN in the DDNS query message before the query message reaches the DNS server 304, the DNS server responding with the resource records and the Domain Translation 307 correctly formatting the DNS response and returning the DNS response answer to the network client 303. Similarly, the Domain Translation 305 can be embodied by an SDN installation that modifies network messages from Internet Device 301s and routes the modified messages to authoritative DNS server 306a, 306b or 306c. The SDN installation can comprise a network switch such as an OpenFlow-compatible network switch and a computer-based SDN controller that supports the OpenFlow protocol, for example the OpenDaylight controller [opendaylight.org] or the Virtual Application Networking controller from Hewlett-Packard [HP]. The SDN controller can include a hard drive containing the software application instructions needed to perform the Domain Translation 307, and Domain Translation 305 services.

In yet another embodiment, the Domain Translation 307 can exist as a computer software module within recursive DNS server 304, operably configured to intercept, translate and forward the DNS query network messages between the client 303 and the recursive DNS server 304. The Domain Translation 305 can also exist as a computer software module within recursive DNS server 304, operably configured to intercept, translate and forward the DNS registration network messages between the Internet Device 301 and the authoritative DNS server 306a, 306b or 306c. The number of authoritative DNS servers is not limited to 3 and may be more or less in other embodiments.

FIG. 5 if a logic flow diagram for a DNS Query 500 using a Domain Translation Service. In the example embodiment, a DNS Query 502 can start with a device name being queried from a DNS server in step 504. Next a DNS query can be detected for a device FQDN in step 506. Then a determination is made of whether the domain is a Very Large Domain in step 508. If the domain is a very large domain then a sub-zone name is computed from the host name in step 510. Next the DNS query is modified for a new FQDN in step 512 before sending the DNS query to the DNS server in step 514. If the domain is not a Very Large Domain in step 508, then steps 510 and 512 are skipped and the process moves directly to step 514. After step 514, the query is received for the new FQDN in step 516 before looking up a DNS entry in the sub-zone in step 518. A DNS response can be modified in step 520 to return the original queried FQDN. Next a DNS address response is received in step 522 before the process is completed in step 524.

FIG. 6 is a logic flow diagram for a DNS Query 600 using a CNAME Response. In the example embodiment, a DNS query is begun in step 602 where a device name is queried in step 604. A DNS query is detected for a device FQDN in step 606 and a sub-zone name is computed from a host name in step 608. Next a new FQDN CNAME is computed in step 610. A DNS CNAME response is sent in step 612 and received in step 614. Next a new FQDN is queried from a DNS server in step 616 before being received in step 618. The DNS entry is looked up in step 620 and the DNS address response is received in step 622 before the process is complete in step 624.

As used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A method of registering DNS hostnames of Internet host devices for a very large domain zone (VLZ) stored on a DNS server on a network, wherein the Internet host devices collectively define a load of the VLZ and further wherein each Internet host device has an original fully qualified domain name (FQDN), comprising:
   instructions stored in non-transitory memory that, when executed by a processor, cause the processor to perform steps including:
      defining a pseudo-zone that represents the VLZ, wherein the pseudo-zone is a unique map from each original FQDN into a hierarchy of a plurality of subzones, each containing a pre-determined number of the Internet host devices such that the load of the VLZ is effectively distributed across multiple servers that are separate but operatively connected to the Internet;
      intercepting DNS updates to the pseudo-zone;
      mapping the entries in the pseudo-zone into a hierarchy of real parent zones and subzones using a mapping formula, wherein the mapping formula includes a hash function used to establish the plurality of sub-zones in the pseudo-zone; and
      translating DNS updates to the pseudo-zone from the original FQDN into at least one new FQDNs and adding the at least one new FQDNs to an authoritative DNS Server.

2. The method of claim 1, wherein the instructions include steps further comprising:
   responding to a DNS query request for one of the registered domain names in the VLZ from a requestor, including:
      intercepting the DNS query request to the pseudo-zone;
      converting the DNS query request to at least one modified DNS query requests;
      sending the at least one modified DNS query requests to a DNS service that is operable to resolve the new FQDN; and
      conveying a DNS response to the requestor.

3. The method of claim 1, wherein mapping using the mapping formula further comprises:
   executing the hash function to obtain a uniform distribution of hash codes;
   truncating the hash codes to obtain n-bit numbers in the range 0 to (m−1) where m is the number of sub-zones desired; and
   prefixing the n-bit numbers with an alphabetic string to form DNS-compliant sub-zones.

4. The method of claim 1, wherein mapping using the mapping formula further comprises:
   executing the hash function to obtain a uniform distribution of hash codes;
   performing a modulus of the hash codes to create a selector that is less than or equal to the size of the list of parent zones; and
   selecting a parent zone from the list of parent zones using the selector.

5. The method of claim 1, wherein mapping using the mapping formula further comprises:
   executing the hash function to obtain a uniform distribution of hash codes;
   truncating the hash codes to obtain n-bit numbers in the range 0 to (m−1) where m is the number of sub-zones desired;
   prefixing the n-bit numbers with an alphabetic string to form DNS-compliant sub-zones;
   performing a modulus of the hash codes to create a selector that is not bigger than the size of the list of parent zones;
   selecting a parent zone from the list of parent zones using the selector; and
   forming a new FQDN by concatenating an original hostname, new sub-zone and selected parent zone.

6. The method of claim 1, wherein the instructions include steps further comprising:
   creating, for each DNS hostname registration in the DNS server, a parent zone if it does not already exist and a sub-zone if it does not already exist.

7. The method of claim 2, wherein conveying the DNS response further comprises:
   intercepting the DNS response to the requestor,
   mapping the new FQDN to the old FQDN,
   replacing the new FQDN with the old FQDN in a modified DNS response; and
   sending the modified DNS response to the requestor.

8. The method of claim 1, wherein the instructions include steps further comprising:
   responding to a DNS query request for one of the registered domain names in the VLZ, including:
      intercepting the DNS query request;
      mapping the DNS query request to the new FQDN
      creating a temporary DNS CNAME response including the new FQDN; and
      sending the DNS CNAME response to the requestor.

* * * * *